United States Patent Office.

CHARLES JAMES EAMES, OF NEW YORK, N. Y.

Letters Patent No. 65,657, dated June 11, 1867.

---

IMPROVEMENT IN PREVENTING INCRUSTATION IN STEAM BOILERS.

---

*The Schedule referred to in these Letters Patent and making part of the same.*

---

TO ALL WHOM IT MAY CONCERN:

Be it known that I, CHARLES JAMES EAMES, of the city, county, and State of New York, have invented a new and improved "Mode of Preventing the Incrustation or Scale in Marine, Locomotive, Stationary, or any other Steam Boilers which are fed with water containing or holding calcareous matters in solution or in suspension, or both;" and I do hereby declare that the following is a full, clear, and exact description thereof, which will enable others skilled in the art to make and use the same.

From many experiments, and by analysis, I have discovered that the incrustation or scale in steam boilers arises from sulphates and carbonates of lime and other earthy salts (but more particularly sulphate of lime,) held in solution by the water when cold, and deposited or precipitated by the water when boiled, and that the addition of decomposing or anti-incrustation agents, as practised heretofore, viz, by introducing the same into the boiler with the feed-water, so increased the density of the water therein as not only to raise the boiling point to a higher temperature for any given pressure, but, in fact, to add to the evil they were designed to remove, by increasing the quantity of solid matter fed into the boiler, which consequently augments the amount of precipitable matter therein, and necessitates more frequent discharges of water from the boiler to keep the water therein at any given density. They also increase the liability of the water in the boiler to foam or froth over.

In the present invention the water, before entering the boiler, is heated by maceration or mixing with such decomposing agents, that by contact the sulphates and carbonates will be rendered insoluble, and changed from a chemical to a mechanical combination with the water, or, in other words, will be no longer held in solution, but in suspension, and deposition or precipitation follows. In order to accelerate the precipitation of the decomposed calcareous matter, the water, after passing through the decomposing agents, and before entering the boiler, is filtered through a layer or stratum of animal carbon or other filtering medium.

In the practical application of my invention, if the water to be used in the boiler has in it, in addition to the salts or calcareous matter held in solution by it, impurities, such as grease, oil, dirt, or vegetable matter, it is first passed through a layer or stratum of animal carbon or sponges, or both, or through any other known and suitable process of filtration, either in a downward or an upward direction, or from one side to the other in a horizontal plane, or in any other suitable direction, as the nature of the case may require, and as may be judged most convenient or advantageous, to cleanse it of each and of all the impurities above named. The water is then passed or percolated through a layer or stratum of native carbonate of barytes (witherite) in powder or granulated, or in any other form deemed advisable, or through artificially prepared carbonate of barytes, either in powder or granulated, which "witherite" or barytes is to be confined in a vessel or vessels of any suitable form, that will best answer the purpose, in which vessels are to be placed wire gauze or any other sieves to form inlets and outlets with or without supporting grating. The direction in which the water passes or percolates through the witherite or barytes may be either horizontal or vertical, or vertically or horizontally angular, as may be deemed most advisable. The water is now passed or percolated through a layer or stratum of oxalate of barytes in substantially a similar manner to that just above described for the carbonate of barytes or the witherite, after which the water is passed through another filter of animal carbon or sponges, or both, or through any other process of filtration. The water is thus freed from all salts of lime or incrustating matter that it held in solution, and is ready to be taken by the feed-pump and fed into the boiler.

Although I have described the water as being passed through the carbonate of barytes first, and afterward through the oxalate of barytes, I do not intend to limit myself to such mode, as the order may be reversed, and the water may be also passed through any number of alternate layers or strata of both, or either one of them may be used alone or singly; but I prefer to use successive layers or strata of both, for the sulphate of lime will exchange equivalents with the carbonate of barytes, forming sulphate of barytes and carbonate of lime, and the carbonate of lime will exchange equivalents with the oxalate of barytes, forming carbonate of barytes and oxalate of lime. Thus by this double decomposition the salts that form the base and body of the incrustation or scale in steam boilers are rendered insoluble, and their precipitation follows, the rapidity of which is governed by the velocity of percolation through the final filter of animal carbon or bone charcoal, which can be increased or decreased at will by giving more or less opening to the supply-cock. It may also be here observed that I do not intend to claim the use of animal carbon or any process of filtration alone or singly, but only their use in connection with the decomposing agents as advantageous adjuncts; in the first instance to remove the impurities in the water, as before stated, and in the second instance to accelerate the precipitation of the salts rendered insoluble by the action of the carbonates and oxalates of barytes.

Having thus described my invention, what I claim as new, and desire to secure by Letters Patent, is—

The mode of preventing the incrustation in steam boilers, substantially as herein described.

CHARLES JAMES EAMES.

Witnesses:
WM. F. MCNAMARA,
ALBERT W. BROWN.